(12) United States Patent
Hoang et al.

(10) Patent No.: US 12,216,545 B2
(45) Date of Patent: Feb. 4, 2025

(54) CLUSTER-WIDE APPLICATION CONSISTENCY WITH VOLUME GROUP SNAPSHOT

(71) Applicant: Dell Products L.P., Round Rock, TX (US)

(72) Inventors: Phuong N. Hoang, San Jose, CA (US); Sukarna Grandhi, Fremont, CA (US); Thomas Watson, Richardson, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/685,628

(22) Filed: Mar. 3, 2022

(65) Prior Publication Data
US 2023/0281082 A1 Sep. 7, 2023

(51) Int. Cl.
*G06F 11/14* (2006.01)
*G06F 9/50* (2006.01)

(52) U.S. Cl.
CPC ........ *G06F 11/1446* (2013.01); *G06F 9/5033* (2013.01); *G06F 2201/84* (2013.01)

(58) Field of Classification Search
CPC .............. G06F 11/1446; G06F 9/5033; G06F 2201/84; G06F 9/48; G06F 2201/815; G06F 11/1458; G06F 2201/82
See application file for complete search history.

(56) References Cited

U.S. PATENT DOCUMENTS

| | | | |
|---|---|---|---|
| 11,226,857 B1 * | 1/2022 | Liang | G06F 11/0793 |
| 2021/0103499 A1 * | 4/2021 | Alluboyina | G06F 3/067 |
| 2021/0328858 A1 * | 10/2021 | Asveren | H04L 61/5007 |
| 2022/0206902 A1 * | 6/2022 | Hoang | G06F 9/541 |
| 2022/0253218 A1 * | 8/2022 | Balasubramanian | G06F 3/065 |

* cited by examiner

*Primary Examiner* — Maher N Algibhah
(74) *Attorney, Agent, or Firm* — Staniford Tomita LLP

(57) ABSTRACT

Embodiments of a method for providing cluster-wide, application consistent operations in a distributed network by creating a single volume snapshot object on a server for all of volumes of a distributed application. A snapshot controller creates volume snapshot content for each volume, and an external snapshot process, upon creation of the volume snapshot content, creates a snapshot of each volume on a backend storage device, wherein all snapshots for each volume are created at the same time to ensure consistency across all volumes being snapshotted at a certain moment.

9 Claims, 12 Drawing Sheets

CLUSTER-WIDE APPLICATION CONSISTENCY WITH VOLUME GROUP SNAPSHOT

TECHNICAL FIELD

Embodiments are generally directed to containerized database applications, and more specifically to application templates for application consistent backup and restore operations.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Containerization technology has been developed as a lightweight alternative to full machine virtualization that involves encapsulating an application in a container with its own operating environment. This provides many of the benefits of loading an application onto a virtual machine (VM), as the application can be run on any suitable physical machine without any concern about dependencies. The well-established Docker program deploys containers as portable, self-sufficient structures that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

The Kubernetes system is a popular container management platform for managing containerized applications in a clustered environment and helps manage related, distributed components across varied infrastructures. Database applications on Kubernetes clusters come in a wide range of configurations and ranges, from standalone deployment to single partition cluster to multiple partition clusters. A common backup process for database protection involves quiescing databases prior to backups. Though Kubernetes generally does not provide a mechanism to natively specify quiescing order for snapshot backups, technology has been developed to allow application (e.g., database) pods to be quiesced and snapshotted in a specific order to ensure application consistency of the cluster deployments not only on a single node but across all the nodes in the cluster.

Certain applications, such as multi-sharded databases running in a Kubernetes cluster, spread data over many volumes that are accessed by multiple pods in a cluster in parallel. For application consistent backups, the backup software must be able to guarantee cross-cluster consistency in the context of an application consistent backup operation. Present systems generally process pods and their volumes in sequence. For example, such a system first quiesces a pod, creates snapshot of its volumes, and then unquiesces the pod. After that, it processes the next pod in sequence. This serial processing may introduce issues because of time latencies between first and last snapshots, which can ultimately cause inconsistency among backup images of volumes being snapshotted.

What is needed, therefore, is a flexible backup workflow that allows customizable actions such as taking snapshots, enabling/disabling load balancing etc., before taking volume snapshots, and re-enabling such actions afterward.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
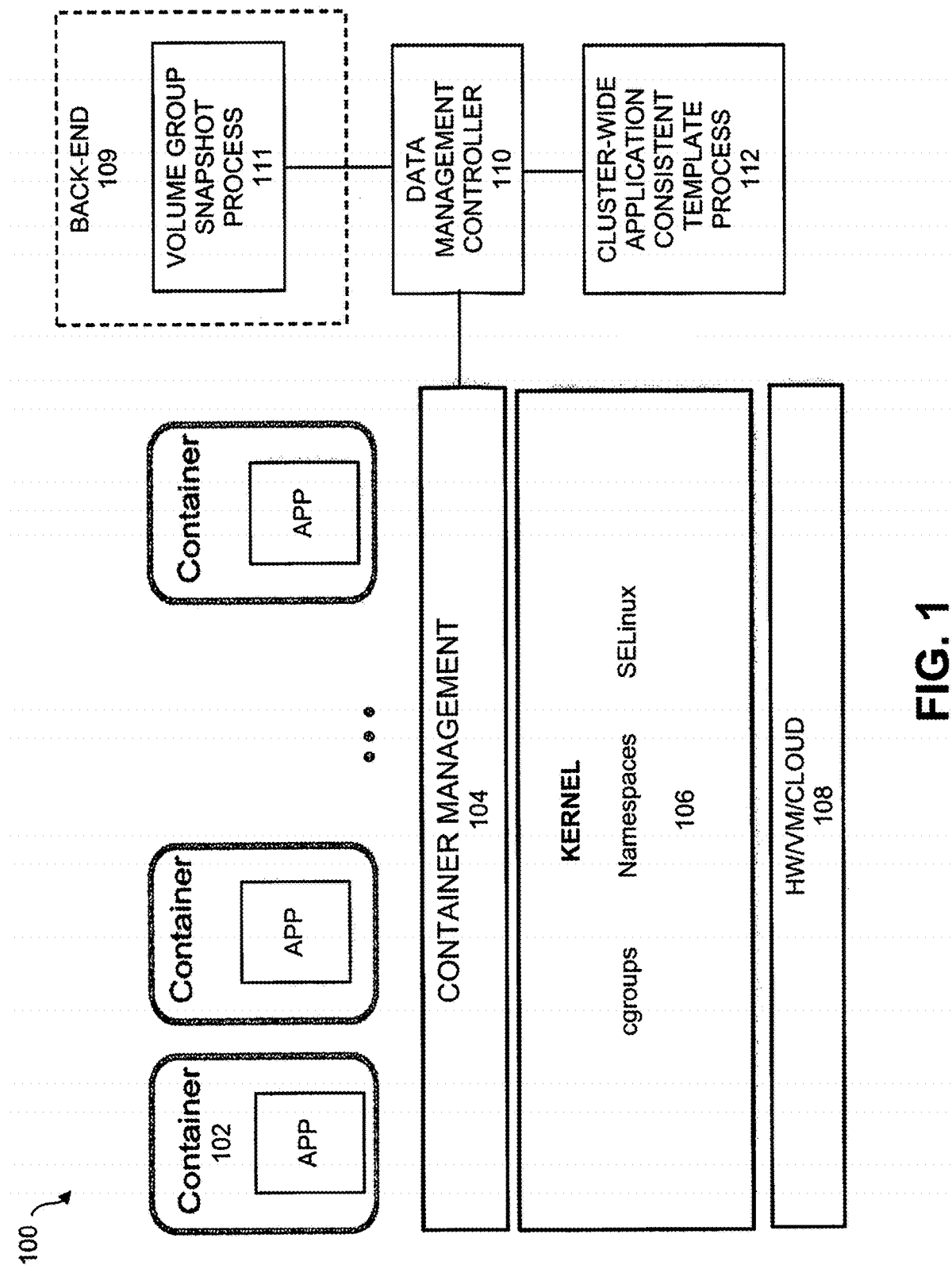
FIG. 1 is a diagram of a container management system implementing an application template processing method providing cluster-side application consistency, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to an application template processing system for application consistent backup and restores of database applications in Kubernetes. In an embodiment, the container management system comprises a Kubernetes system, though all embodiments are not so limited. Other container management systems similar to Kubernetes may also be used, and specific reference to Kubernetes is meant to be primarily for example or illustration.

FIG. 1 is a diagram of a container management system implementing an application template processing method providing cluster-side application consistency, under some embodiments. As shown in FIG. 1, system 100, a number of applications (apps) are encapsulated in respective containers 102 so that each application operates within its own operating environment. The containers are deployed as portable, self-sufficient data structures that can run any practical hardware platform 108 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 100 utilizes the Docker container format to abstract the lower layer of container technology, though other similar formats may also be used. An application can run in multiple containers, and usually a container will just run a single micro service.

The container management layer 104 is used to automate the creation, destruction, deployment and scaling of the containers 102. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration.

Such disaster recovery and data restore applications typically involve a data backup system for backing up database data. One example is a Dell PowerProtect data management system that is a software defined data protection system including automated discovery, data deduplication, self-service and IT governance for physical, virtual and cloud environments. For this embodiment, system 100 includes a data management controller 110 coupled to or provided as part of the container management process 104. Although embodiments are described with respect to PowerProtect data management systems, and other related systems, such as Data Domain, it should be noted that embodiments are not so limited, and other similar platforms may also be used.

To support certain application template processes, an application consistent application template processing component 112 is coupled to or provided as part of the data management controller 110. This process works with a volume group snapshot process 111 that creates snapshots of all volumes belonging to a specified group at the same time. In an embodiment, the volume group snapshot process 111 is provided as part of a back-end process 109 or separate server, such as a backup server.

In an embodiment, the container management layer 104 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster.

Figure 2:
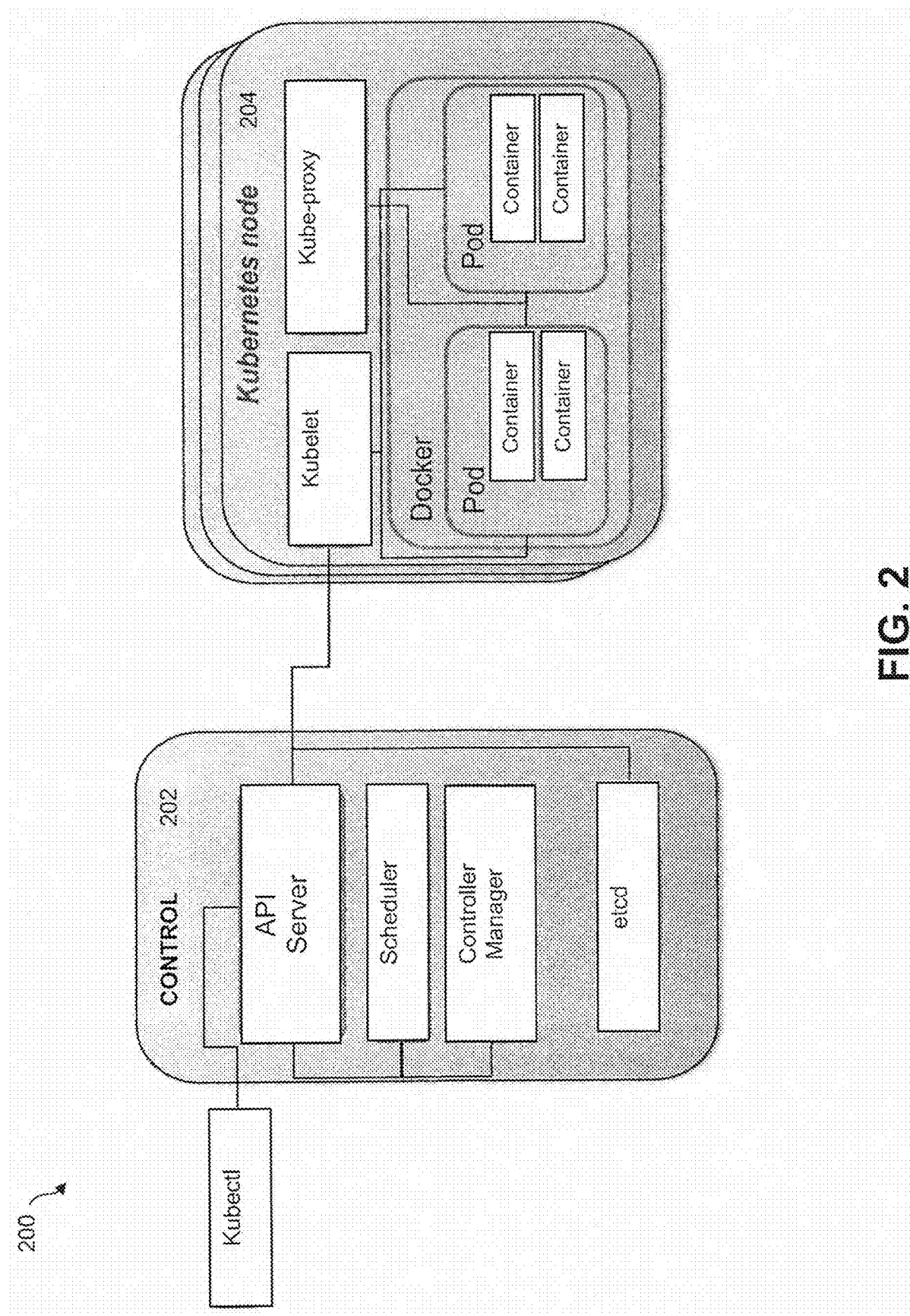
FIG. 2 is a block diagram that illustrates the architecture of a Kubernetes platform implementing an application template processing method, under some embodiments.

FIG. 2 is a block diagram 200 that illustrates the architecture of a Kubernetes platform implementing an application consistent template process 112, under some embodiments. The controlling services in a Kubernetes cluster are called the control plane 202 components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

Within the control plane is an API server that allows a user to configure many of Kubernetes' workloads and organizational units. It also is responsible for making sure that the etcd store (which stores configuration data to be used by the nodes) and the service details of deployed containers are in agreement. It acts as the bridge between various components to maintain cluster health and disseminate information and commands. The API server implements a RESTful interface, which means that many different tools and libraries can readily communicate with it. A client called kube c f g is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, and so on.

The scheduler assigns workloads to specific nodes in the cluster. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the control plane components 202, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed.

The main contact point for each node with the cluster group is through a small service called kubelet. This service is responsible for relaying information to and from the control plane services, as well as interacting with the etcd store to read configuration details or write new values. The kubelet service communicates with the control plane components to receive commands and work. Work is received in the form of a "manifest" which defines the workload and the operating parameters. The kubelet process then assumes responsibility for maintaining the state of the work on the node server. To allow individual host subnetting and make services available to external parties, a small proxy service is run on each node server. The proxy forwards requests to the correct containers, performs load balancing, and other functions.

While containers are used to deploy applications, the workloads that define each type of work are specific to Kubernetes. Different types of 'work' can be assigned. Containers themselves are not assigned to hosts. Instead, closely related containers (that should be controlled as a single 'application') are grouped together in a pod. This association leads all of the involved containers to be scheduled on the same host. They are managed as a unit and they share an environment so that they can share volumes and IP space, and can be deployed and scaled as a single application. Pods can be thought of as a single virtual computer and is the basic building block of Kubernetes and comprises one or more containers and share storage resources, and network resources. Pods run in a shared context and share the same IP using different port for containers.

With respect to data replication, a more complex version of a pod is a replicated pod. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers.

In Kubernetes, source material is often expressed as a parameterized template. A tool processes the template by executing any embedded scripting and replaces parameters with desired values to generate a particular configuration. Different sets of values using the same template allow for convenient reuse of containers. One way to handle templates is with Helm, which is the package manager for Kubernetes, which includes templating capabilities and works at the application level to allow multiple manifests to be deployed together.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. Replication controllers give all of the containers spawned from their templates the same label. This makes it easy for the controller to monitor each instance. The controller or the administrator can manage all of the instances as a group, regardless of how many containers have been spawned.

Labels are given as key-value pairs. Each unit can have more than one label, but each unit can only have one entry for each key. Pods can be given a name key as a general purpose identifier, or they can be classified by various criteria such as development stage, public accessibility, application version, etc. In many cases, many labels can be assigned for fine-grained control. A user can then select based on a single or combined label requirements.

Data Protection

Data protection in large-scale database processing systems involves backing up large amounts of data at regular time intervals. A simple backup using a database dump operation (e.g., mysqldump), which is a logical export of the database system, sends output files as streams to a backup storage device, such as a Data Domain Appliance, or similar.

This approach provides a single solution for all types of Kubernetes PersistentVolumeClaim (PVC) systems, and the same implementation is provided for all databases, and application consistency is provided by the database dump operation. However, this simple approach has several drawbacks: (1) incremental backups are not possible, as even a small change requires dumping the entire database, (2) high consumption of processor resources (e.g., deduplication processing), (3) metadata and configuration information may not be protected so additional work needed to make sure the application pod will be recovered properly (may result in PVC contents being backed up twice), and (4) the dump does not back up all the nodes in the cluster, so the user needs to back it from one or all the nodes, and rebuild the cluster manually during disaster recovery.

Another backup process for databases is a backup using volume snapshots with database quiescing, such as using a VMware First Class Disk (FCD). In this process, a volume snapshot is taken which can be based on a previous snapshot, thus providing incremental backup capability. The snapshot operation is instantaneous (e.g., on the order of seconds), thus saving much time, and after the snapshot is created, the application pod can resume other user operations, as the backup workload to save the snapshot data to the backup storage device will be handled by the infrastructure in the background. Furthermore, utilizing volume snapshots with database quiescing enables an agentless architecture which means no agents need to be installed on the application pods for backup or restore purposes.

This approach, however, also has certain drawbacks: (1) quiesce and snapshot creation time may interfere with user operations of the database especially if the backup takes place during time sensitive database operations, and (2) each database deployment (standalone, cluster, distributed database) may require a different application template.

In general, quiescing a database puts it into state that locks out all users so that administrative tasks can be performed. A quiesce command may allow current active transactions to complete and then flush modified buffers from the cache to the stable database. For some databases, during a quiesced backup, updating transactions are not permitted and attempts to execute database transactions raise a database exception. For other applications, a similar suspension command may be used to stop reads/writes transactions while backup or other similar tasks are performed. For purposes of example, embodiments are described with respect to quiescing database applications while backup/recovery or other data management tasks are performed. It should be noted, however, that embodiments are not so limited, and any application that involves continuous input/output operations that need to be temporarily stopped during backup or other administrative periods may also be used.

As previously stated, database applications on a Kubernetes cluster typically come in a wide range of configurations, such as standalone or single cluster deployment to multiple partitions/clusters. In an embodiment, an application template process 112 is provided as an extensible framework that enables flexible and configurable method to provide application consistent backup and restores of database applications using Kubernetes volume snapshots in this wide range of requirements and configurations. The application template process allows application pods to be quiesced and snapshot backed up in a specific order to ensure application consistency of the cluster deployments, not only on a single node but across all the nodes in the cluster.

The application template allows a user to efficiently suspend (quiesce) and restart certain operations for the execution of backup (or other admin) tasks based on common operation or characteristics of nodes or groups of nodes. In an embodiment, the suspend/restart processes are implemented through a series of hook mechanisms comprising a prehook and posthook to suspend a process and restart the process. Hooks can be implemented at different application layers. For example a first prehook/posthook pair can be used at the top or entire application layer, a second prehook/posthook pair can be used at a middle layer, and a third prehook/posthook pair can be used at the pod level or bottom level.

In an embodiment, the application template process 112 specifies the label used in all pods of the application and the multiple actions for Kubernetes resource types. Each action contains hooks (commands being executed on the specific resource type) and selectors to serialize backup of resource instances in specific order. A prehook (DO) command suspends the application activities and a posthook (UNDO) operation restarts the suspended activities, so that application consistency is maintained during the backup process. In the action for Kubernetes pods, the database quiesce command will be specified in the prehook and the unquiesce command will be specified in the posthook. System-wide operations such as disable/enable database cluster level load balancer can be specified in the hooks of the application action.

Figure 3:
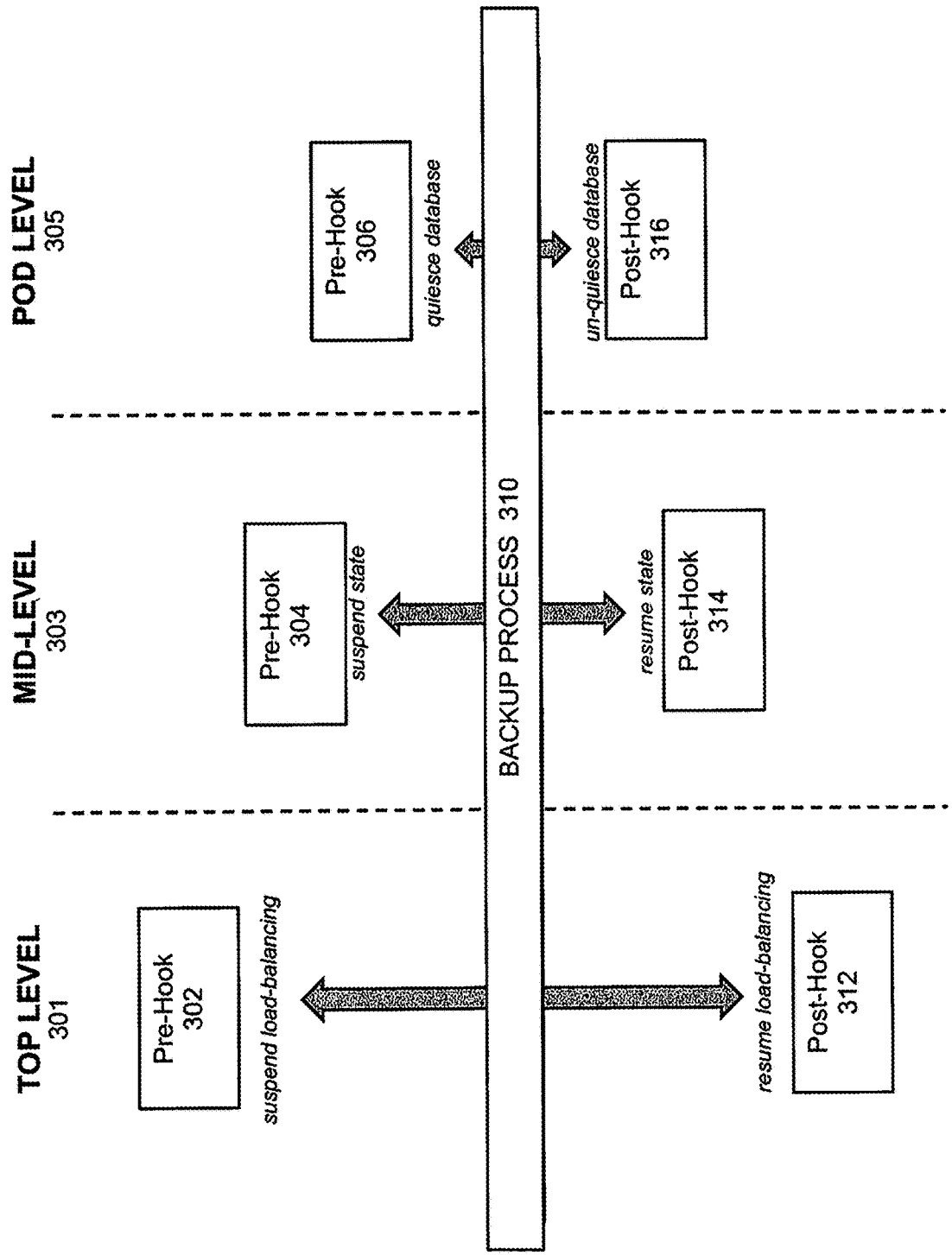
FIG. 3 illustrates a hook mechanism implemented in three layers in an example embodiment

FIG. 3 illustrates a hook mechanism implemented in three levels or layers in an example embodiment. As shown in FIG. 3, the three example levels are a top level 301, a middle level 303, and a pod or bottom level 305. The top level 301 represents the entire application instance before the backup process 310 is run. An operation that may need to be suspended in this case is load balancing. At this level, before the backup is done, the system suspends load balancing through pre-hook 302 and after the backup is complete, the load balancing function is resumed by post-hook 312. A selector function of the top layer can also be used to arrange operations of lower layer in a specific order.

The middle layer 303 represents any tasks within the application that may need to be temporarily suspended. For example, if the application is composed of multiple StatefulSet processes, such as data processes, management processes, or client I/O processes, these processes may need to be suspended. In this case, pre-hook 304 and post-hook 314 pairs can be used for each StatefulSet operations to suspend the state prior to the backup 310 and then resume the state after the backup. Other Kubernetes collector resource types such as Deployment, DaemonSet, ReplicationController, and so on, can also be used in middle layer. Similar to the top layer, the selectors of middle layer can also be used to arrange operations of pod layer in a specific order.

As shown in FIG. 3, the bottom level is the pod level 305, and this level is controlled by pre-hook 306 and post-hook 316, which can be used to quiesce and un-quiesce the database, or any other pod level operation that needs to be temporarily suspended during backup process 310.

In an embodiment, the application templates are deployed to users' namespaces to protect database applications in those target namespaces. For example, application templates on the "PowerProtect" namespace will provide default implementation for all users' namespaces, while application templates on a user's namespace will affect that specific namespace only.

Figure 4:
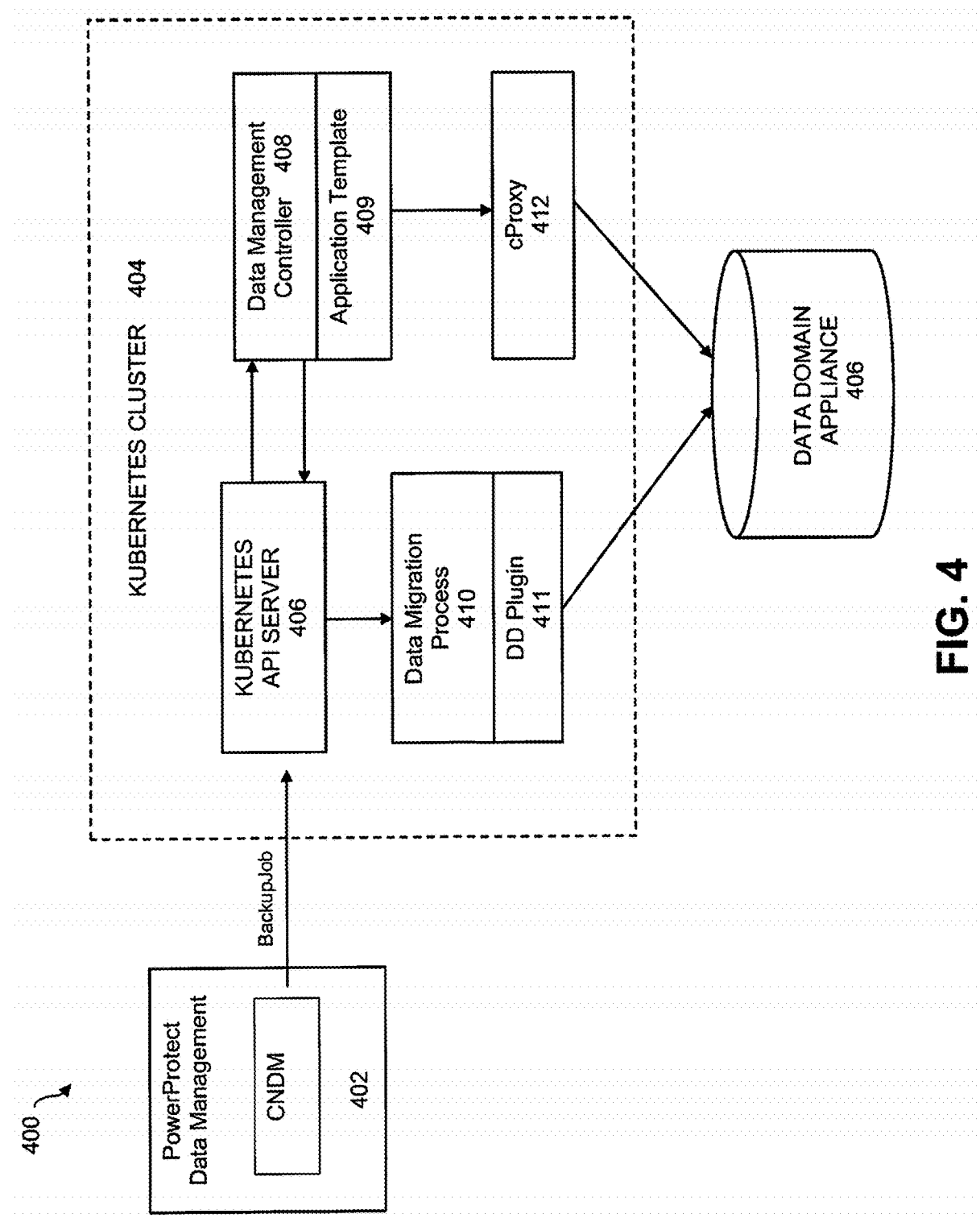
FIG. 4 illustrates implementation of the application template mechanism in a PowerProtect and Data Domain backup system, under an example embodiment.

FIG. 4 illustrates implementation of the application template mechanism in a data management and backup system, under an example embodiment. As shown in FIG. 4, system 400 includes a data management system (e.g., PowerProtect Data Management, PPDM) system 402, that backs up data from Kubernetes cluster 404 to deduplicated back storage 406, which may be a Data Domain, or similar appliance. The Kubernetes cluster 404 includes an API server 406 and a data management (e.g., PPDM) controller 408. Controller 408 listens to the creation event of backup job on API server 406. Upon initiation of a backup job by PPDM 402, the controller 408 detects the creation of backup job on API server 406 and the controller then sends a backup command back to the API server to back up the specified namespace using the metadata migration process 410. In an embodiment, this component may be implemented as a tool to safely backup, restore, perform disaster recovery, and migrate Kubernetes cluster resources. Process 410 backs up the namespace and its resources to the storage through an appropriate plugin, such as DD plugin 411 for Data Domain appliance 406. The controller 408 also creates one or more snapshot backups, which are each backed up to the storage appliance 406 through a proxy 412.

Before the controller 408 backs up a namespace, it will use application template process 409 to generate hook annotations on all application pods that have label matching with the label specified in the application template. The controller 408 will then use selectors of each resource type to sequence these pods within such resource. After such a sequence generated, the controller will proceed with backup procedure based on this sequence. In this manner, the application pods will be backed up in that specific order. For example, a MySQL server requires the secondary pod to backed up before the primary pod so that during the restore, the MySQL server can reestablish the relationship and recover itself on both sides to a consistent point in time.

Figure 5:
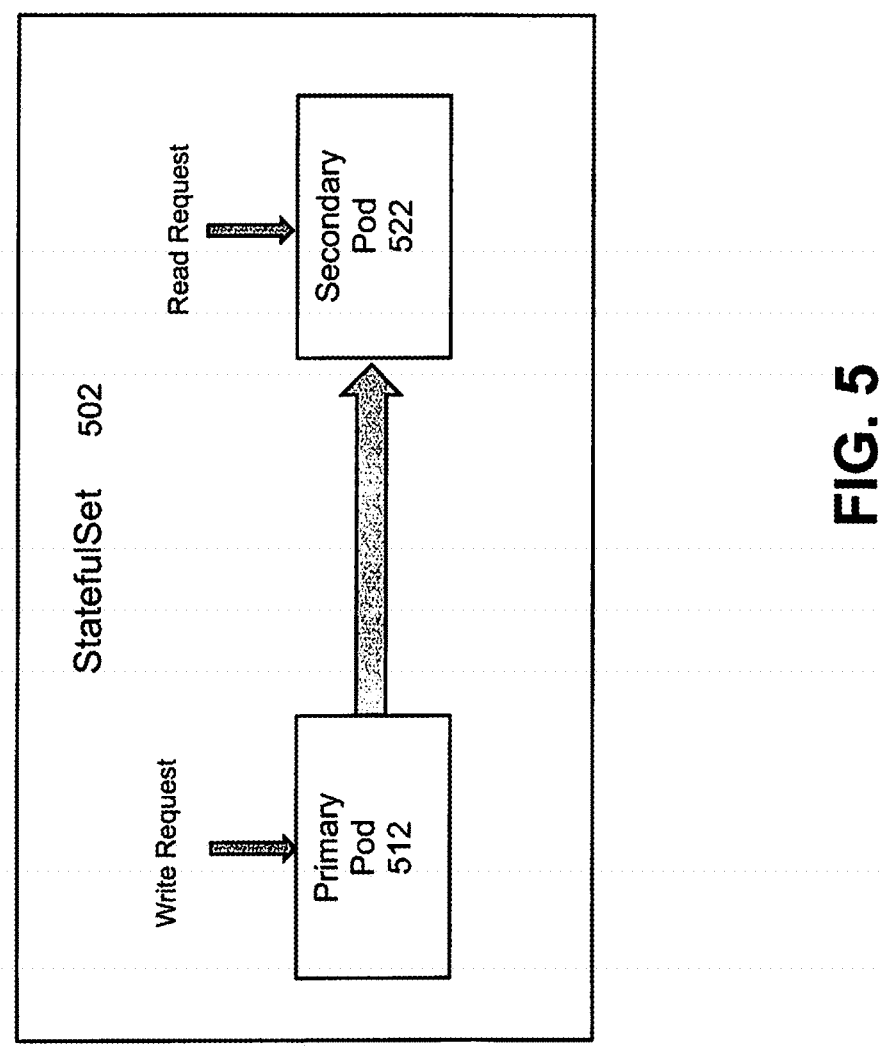
FIG. 5 illustrates an example database deployment in Kubernetes with a MySQL Cluster, under some embodiments.
Figure 6:
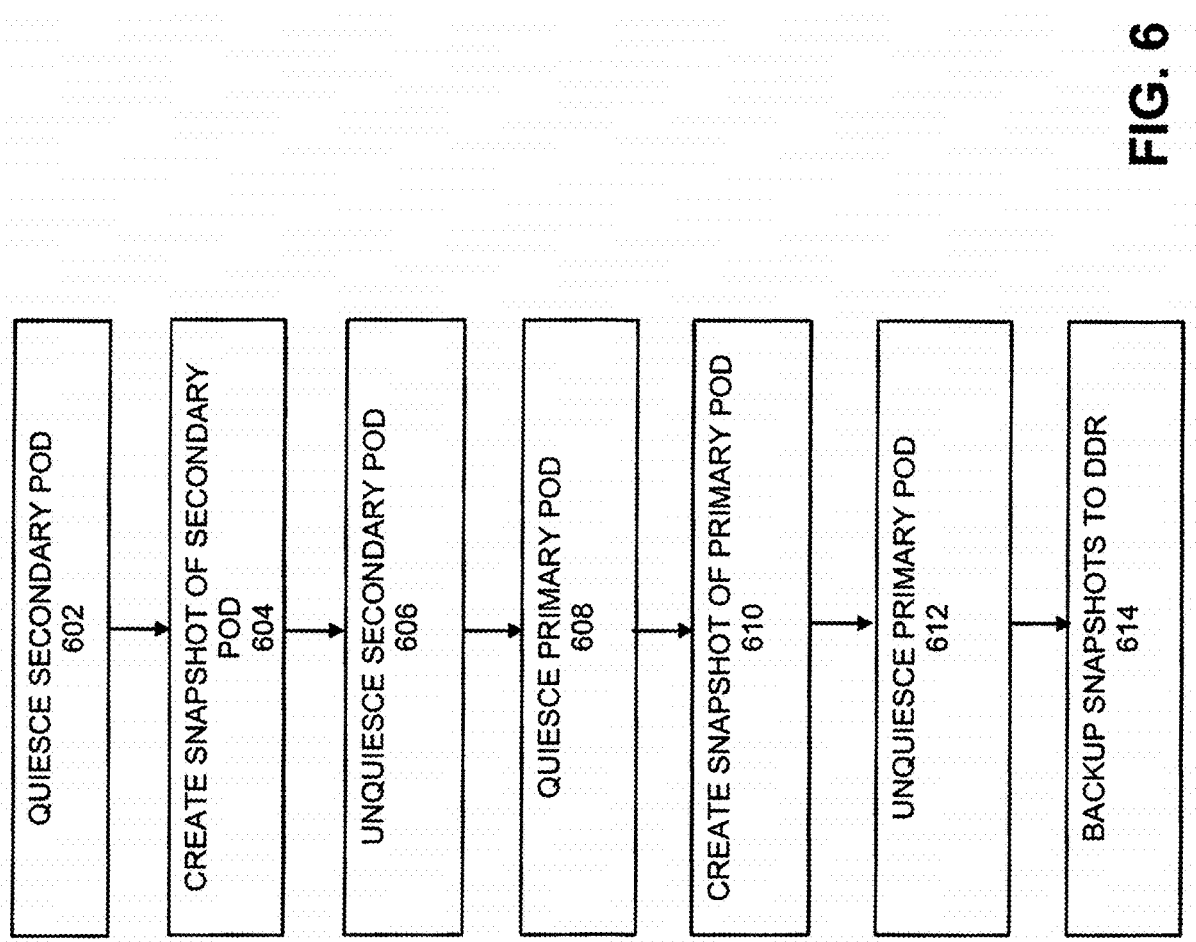
FIG. 6 is a flowchart that illustrates a preferred backup order for the pods of FIG. 5, under some embodiments.

FIG. 5 illustrates an example database deployment in Kubernetes with a MySQL cluster, under some embodiments. As shown in FIG. 5, the StatefulSet 502 has a primary pod 512 processing write requests, while the secondary pod 522 processing read requests. As stated above, the MySQL server requires the secondary pod to be backed up before the primary pod for data restore purposes. FIG. 6 is a flowchart that illustrates a preferred backup order for the pods of FIG. 5, under some embodiments. As shown in FIG. 6, the server will first quiesce the secondary pod 522 in step 602, prior to taking a snapshot backup of the secondary pod 522 in step 604. It will then unquiesce the secondary pod 522, step 606. Once the secondary pod is finished, the server will then quiesce the primary pod 512 of the StatefulSet 502 in step 608, prior to taking a snapshot backup of the pod 512 in step 610. It will then unquiesce the pod 512, step 612. The snapshot backups can then be written to the storage (e.g., DDR appliance 406), step 614.

For each pod being backed up, if the pod will need to be quiesced, the controller 408 will add hook annotations to the pod. During backup operations, if the hook annotations are present on that pod, then the prehook (quiesce command/script) will be executed before the pod metadata is backed up and the pod's PersistentVolumeClaims (PVC) will be snapshotted. After the pod is successfully backed up, the posthook (unquiesce command/script) will be executed.

FIG. 5 illustrates an example system, such as a MySQL database where the primary pod and the secondary StatefulSet need to be backed up in a specific order. Other databases, such as Cassandra, may treat all pods in the same way, in which case the application template may be defined accordingly.

Figure 7:
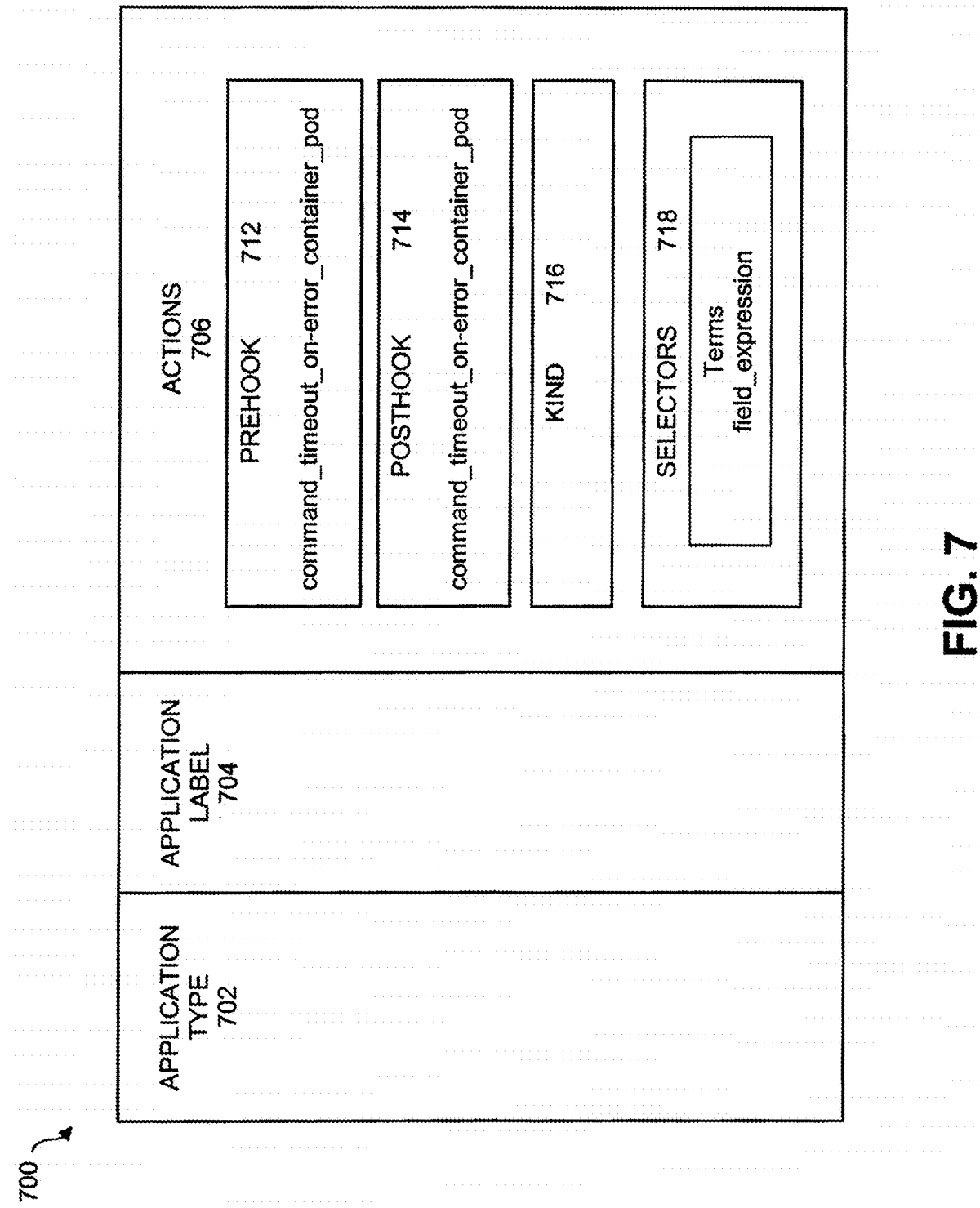
FIG. 7 illustrates a composition of an application template, under some embodiments.

In an embodiment, each application template includes a number of data fields. FIG. 7 illustrates a composition of an application template, under some embodiments. As shown in FIG. 7, application template 700 comprises an application type field 702 that specifies the type of database/application to be processed, such "MYSQL," "MongoDB," and so on. The application label field 704 is a label selector used by all resources of the application. The main part of the application template 700 comprises the actions field 706, which is a map of action to perform on specific type of resource. Each action can have the following fields. A PreHook 712 that is the hook to be executed on the resource before the backup operation. A hook can have the following fields: the command to be executed, a timeout value specifying how long to wait for the command to execute, an on-error value specifying what to do if the command returns non-zero exit code, a container subfield indicating the container where the command should be executed, and a pod subfield identifying the pod where the command should be executed. The actions can also have a PostHook 714, which is the hook to be executed on the resource after backup, and has same format as the PreHook 712, and the subfield values can be the same or different. The Kind field 716 specifies the type of resources that the selectors will act upon. These are the resources that are contained inside the action's resource type. For example, for a stateful sets action, the Kind field can be 'pod.'

The Selectors field 718 in actions 706 is a list of selectors to pick up specific resources during the serialization phase. Each selector is an array of terms that are logically "AND" together to select specific resource. Each term has the following fields: (1) field: specify the resource field to apply ('Name,' 'Labels' or Annotations'), and (2) selector expression: regular expression selector expression (Ex: "app: mysql") to select a resource. The selector terms select an entity under a defined resource type. For example, if the resource type is "StatefulSet" then the terms specify how to pick a pod to backup.

An example application template for a clustered MySQL application deployed in a StatefulSet with 1 primary pod (index 0) and N secondary pods (index 1 . . . N−1) is given below. In this cluster configuration (as illustrated in FIG. 5), the primary pods handle write requests while the secondary pods handle read requests therefore all new data will be on the primary pod first, then later the synchronization process will replicate data to all secondary pods. During backup, the secondary pods need to be backed up before the primary pod (as shown in FIG. 6) to guarantee that the data of the primary pod in the backup image will always be the latest.

An example application template to perform this task is provided as follows:

```
apiVersion: "powerprotect.dell.com/v1beta1"
kind: ApplicationTemplate
metadata:
name: ClusteredMySQLTemplate
namespace: examplenamespace
spec:
   type: MYSQL
   appLabel: "app=mysql"
   actions:
      Pod:
         preHook:
            command: '["/bin/sh", "-c", "mysql -uroot -p$MYSQL_ROOT_PASSWORD -e \"FLUSH TABLES WITH READ LOCK; FLUSH LOGS;SELECT SLEEP(100);\" >/tmp/x2.log 2>&1 & for i in 1..10; do sleep 1; mysql -uroot -p$MYSQL_ROOT_PASSWORD -e \"SHOW PROCESSLIST\" | grep \"SLEEP(100)\" > /tmp/sleep.pid ; if [ $? -eq 0 ]; then exit 0; fi; done; exit 1"]'
         postHook:
            command: '["/bin/sh", "-c",
```

-continued

```
"SLEEPPID=`cut -f1 /tmp/sleep.pid` ; mysql -uroot -
p$MYSQL_ROOT_PASSWORD -e \"KILL $SLEEPPID\" ; rm
/tmp/sleep.pid"]'
    StatefulSet:
        selectors:
            - selectorTerms:
                - field: "Labels"
                  selectorExpression: "app=mysql"
                - field: "Name"
                  selectorExpression: ".*-[1-9][0-
9]*$'" # Secondary pods with index > 0
            - selectorTerms:
                - field: "Labels"
                  selectorExpression: "app=mysql"
                - field: "Name"
                  selectorExpression: ".*- 0$'" #
Primary pod index 0
```

The application template above is provided for purposes of illustration only, and any other appropriate application template may be used for specific database applications.

Embodiments have been described for an application template process that provides application consistent backups for a wide range of database applications and deployment configurations. The defined application template allows specifying quiesce and unquiesce commands for each type of database application and template selectors to select resources to sequence dependent resources to ensure application consistency of the backup operation in a cluster configuration.

The method also includes establishing a framework in a backup or data management controller that processes application templates into sequence of actions for application consistent backup of database applications. The framework comprises a preprocessing phase selecting pods that match the application template application label and creating prehook and posthook annotations on these pods, and a serialization phase that uses the action's selectors to pick up resources in a specific order to generate a sequence of pods to be backed up. This will ensure the relationship of data in a cluster database will be maintained in the backup image. Execution of the system-wide operations in the action of the application resource thus ensures consistency across multiple database partitions.

In a more specific embodiment, the method also includes quiescing and unquiescing a database (e.g., MySQL) in two separate sessions. For example, a normal MySQL quiesce command would automatically release database locks when the session terminated. Since quiesce and unquiesce operations have to be executed on two different sessions, the method specified in the application template for MySQL will put separate scripts on the prehook and posthook of the MySQL pod. The prehook script starts a sequence of MySQL commands that first locks the database and puts it to sleep for a specific period of time (e.g., specified in snapshot timeout). The script then puts the process of executing this sequence of MySQL commands in the background. This effectively keeps the session alive while controller taking snapshots of the PVCs. When snapshots are done, the posthook will be executed. The posthook script will find the process ID of the MySQL command started in the prehook and kill it, which releases the lock and effectively unquiesces the database.

Figure 8:
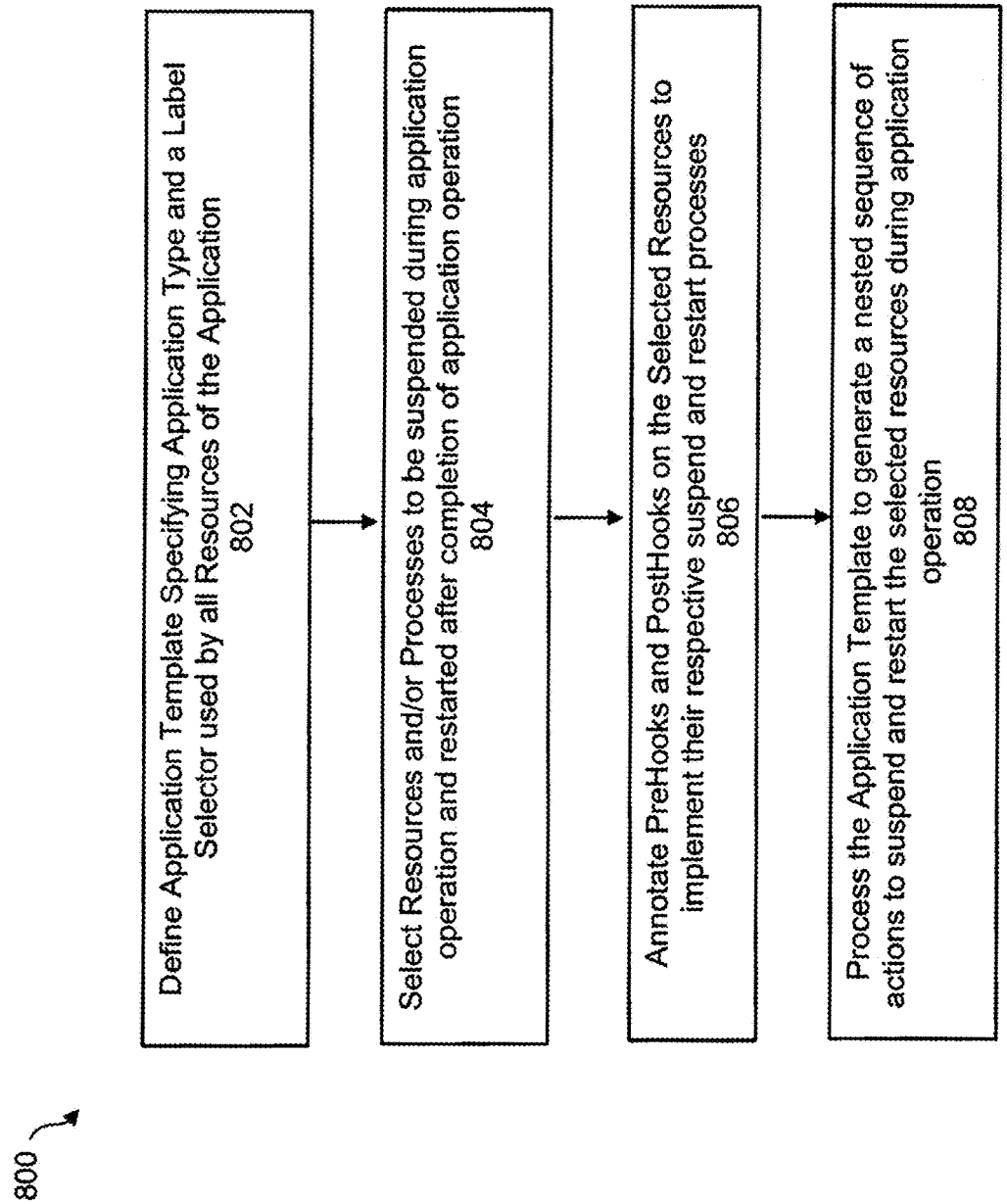
FIG. 8 is a flowchart illustrating a general method of providing application consistent database operations using an application template, under some embodiments.

FIG. 8 is a flowchart illustrating a general method of providing application consistent database operations using an application template, under some embodiments. As shown in FIG. 8, process 800 begins by defining an application template 700 that specifies the application type and label selectors used by all resources of the application, 802. In the Kubernetes cluster example, the resources can be pods having data to be backed up and controlled by a backup controller to backup storage, as shown in FIGS. 4 and 5. The resources and/or processes that are to be suspended during operation of the application (backup) are selected and defined in the Actions 706 portion of the application template, 804. Depending on the network topography and application structure, these resources may be embodied in different levels or layers of the system, such as at the overall application level, one or more middle levels, and a bottom (e.g., pod) level, as shown in FIG. 3. The prehook and posthook mechanism is used to annotate the selected resources to provide entry points (hooks) for the execution of appropriate scripts or programs that perform the actual suspension and restart of the resource during execution of the application, 806. For example, quiescing and unquiescing database pods during a backup operation. The application template is then processed or executed to perform the application and suspend/restart the selected resources based on the defined prehook/posthook annotations. Depending on the level structure of the system, this may result in a nested sequence of resource suspension/restart operations, as shown in FIG. 3.

Besides database backup operations, the application template and prehook/posthook mechanisms can also be used to provide application consistent restore operations when data is migrated back to the nodes from the storage device. For example, during a restore process, all resource types (e.g., StatefulSet, Deployment, ReplicationController, etc.) are scaled down to 0 so that all pods are terminated. All PVCs are restored first, then pods and other resources are restored next. In this case, applications can be restarted with no need to quiesce and unquiesce the pods.

This pair-ordered sequence of suspending and restarting selected resources allows the application operation to proceed as intended, and brings back system resources in an ordered and controlled manner so that the resources maintain consistency during the application operation. For database and similar applications, this provides application consistent backup and restores of the databases in clustered or large-scale networks with multiple and disparate resources and time critical executables that may interfere with the normal backup and restore operations.

In a large-scale network or one with many different applications and deployments, different applications and deployments may require their own separate application templates. Thus, any number of application templates may be used in a network system depending on application types, configurations, and requirements, as well as the different resources and their effect reads/writes during application execution.

Cluster-Wide Application Consistency Using Volume Groups Snapshot

The above-described application template framework processes pods and their volumes in sequence. As shown in FIG. 6, the process first quiesces a pod, then creates snapshot of its PVCs and unquiesces the pod. After that it processes the next pod in sequence. For each PVC snapshot, the framework involves snapshot controller, external snapshot process and the Kubernetes Container Storage Interface (CSI) driver to work together and communicate via the Kubernetes API server using two objects volume snapshot, and volume snapshot content. Because of the involvement of these components in a series of actions for each PVC, if these PVCs are snapshotted serially, the time difference (latency between the first PVC snapshot and the last PVC snapshot can be quite large. During this time delay, the application pods are quiesced and unquiesced at different time, thus user data on each PVC could be changing while other PVCs are being snapshotted. This can create an inconsistency among the backup image of PVCs belong to the application. Even when the framework is optimized to process these resources in parallel, there are no guarantee the consistency across the cluster because for each PVC being snapshotted, there are many components involved. For cluster-wide applications, such as multi-sharded databases (e.g., MongoDB or Cassandra) with large numbers of pods and volumes, the differences in snapshot time of PVCs could be significant to guarantee that application would be backup properly especially in high workload scenario.

In an embodiment, the cluster-wide application consistent template process 112 uses a volume group snapshot feature 111 of certain backend storage systems 109 to create snapshots of all volumes belonging to a specified group at the same time. This helps guarantee cross-cluster consistency. The backup system then employs this volume group snapshot in a backup workflow specified by the application template in a flexible way to that allows customizable actions, such as disabling load balancing, quiescing pods, and so on, before taking volume group snapshots, and afterward re-enabling load balancing, unquiescing pods, etc.

As shown in FIG. 7, the application template comprises two fields, the application label 704 and the application actions 706. The application label specifies a label for all application pods that belong to this application, and the application actions specify a map of actions to be performed on each type of resources.

Each application action of a specific resource type has following fields: PreHook 712 and PostHook 714 that specify commands to be executed before and after a backup this resource type. The other fields are Kind 716 and Selectors 718 that allow the creation of a sequence of resource objects contained in this resource. For example, in the application action for StatefulSet, the StatefulSet would contain Pods. The user can specify Kind as Pod and specify Selectors to pick Pods to create a sequence of pod backup. Each Selector in the Selectors array will pick up a specific Pod or set of Pods. The order of Selector in the Selectors array determine the order of Pods in the backup sequence.

There are three general types of application action (AppAction). The first is an AppAction for a Pod. This is lowest level which usually specify quiesce/unquiesce command to be executed before and after creating snapshots of volumes being used by the pod. The second is an AppAction for collector resource types such as StatefulSet, DaemonSet etc. This is a mid-layer AppAction that allows setting up pods belong to this StatefulSet, DaemonSet etc. to be backed up in a specific order. The third type is an AppAction for the application as a whole. This allows specifying an action to be performed before and after backup of the application (e.g., disable load balancing, disable node membership operations etc.) and the corresponding re-enable actions after the backup is complete. It also allows specifying the sequence of backup of its contained resources. For example, suppose a MySQL cluster has two StatefulSets, and the user wants to back up the secondary StatefulSet before the primary StatefulSet. In this case, the user can create an application template which has application AppAction which specified "Kind" as StatefulSet and the Selectors would have two Selectors. The first Selector would select the secondary StatefulSet and the second selector would select primary StatefulSet.

An example application template for a MySQL cluster with two stateful sets is provided as follows:

```
AppLabel: "app=mysql"
Type: "MYSQL"
AppActions:
  - Pod:
    > PreHook: "DefaultMySQLQuiesce"
    > PostHook: "DefaultMySQLUnQuiesce"
  - Application:
    > Kind: StatefulSet
    > Selectors:
      SelectorTerms: [{"Name", "mysql-cluster-secondary"}]
      SelectorTerms: [{"Name", "mysql-cluster-primary"}]
```

Embodiments of system 100 use the combination of application template and volume group snapshots to provide cluster-wide application consistency in a flexible way. To create a snapshot for an individual PVC, the process 112 first creates a volume snapshot object on the Kubernetes API server. The Kubernetes snapshot controller then creates the volume snapshot content. At this time, the external snapshot process sees the creation of the volume snapshot content so it starts to work with the CSI driver to create the snapshot on the backend storage device 109. This series of actions is done for each PVC. If each PVC is being snapshotted serially, the time difference between the first PVC snapshot and the last PVC snapshot would be quite large. Even if these PVC snapshot processes are run in parallel, the involvement of the multiple components described above would create a lot of time variance between the snapshots.

In general, a CSI driver is typically deployed in a Kubernetes system as a controller component and a per-node component. The controller component can be deployed as a StatefulSet on any node in the cluster. Any similar driver component can be used as required in possible non-Kubernetes implementations.

In an embodiment, a volume group snapshot feature is used to create all snapshots for pods within a group at once. To create a volume group snapshot, the controller 408 in system 400 creates the VolumeGroupSnapshot object on the API Server 406. A VolumeGroupSnapshot controller listens to the creation event of the VolumeGroup Snapshot object and communicates with the backend storage to create snapshots of all volumes in the VolumeGroup in one single snapshot operation. The VolumeGroupSnapshot controller then creates a VolumeSnapshot object and VolumeSnapshotContent object for each snapshot in the backend storage. It should be noted that there is a difference between the snapshot in the backend storage and the VolumeSnapshot object on the API Server 406. The backend storage has volumes (where the data is actually stored) and backend storage to create a snapshot of these volumes. The backend storage snapshot has a handle (e.g., a string identifier) which is then presented as snapshotHandle field of the VolumeSnapshotContent object on the API server 406. The VolumeSnapshot object on the API server is linked to the VolumeSnapshotContent. For a volume group snapshot, there can be multiple snapshots in the backend storage device (one for a volume), and these snapshots are mapped to the corresponding VolumeSnapshotContent objects and VolumeSnapshot objects on the API server, 406.

Under an embodiment, the process 112 creates one volume group snapshot object. The snapshot controller then communicates with back end storage to create all snapshots at once. This ensures the consistency across all volumes being snapshotted at that moment. The application template framework then takes advantages of this feature to quiesce all pods before creating volume group snapshot and unquiesce all pods after to guarantee the content of all volumes does not change during the process. In this way, the total time that the application gets interrupted by quiescing is reduced significantly.

The application template framework also allows the user to specify PreHooks and PostHooks at multiple component layers and allow sequencing multiple volume groups. This makes the backup framework more flexible, easy to customize to use in multiple types of application and deployment configurations.

Figure 9:
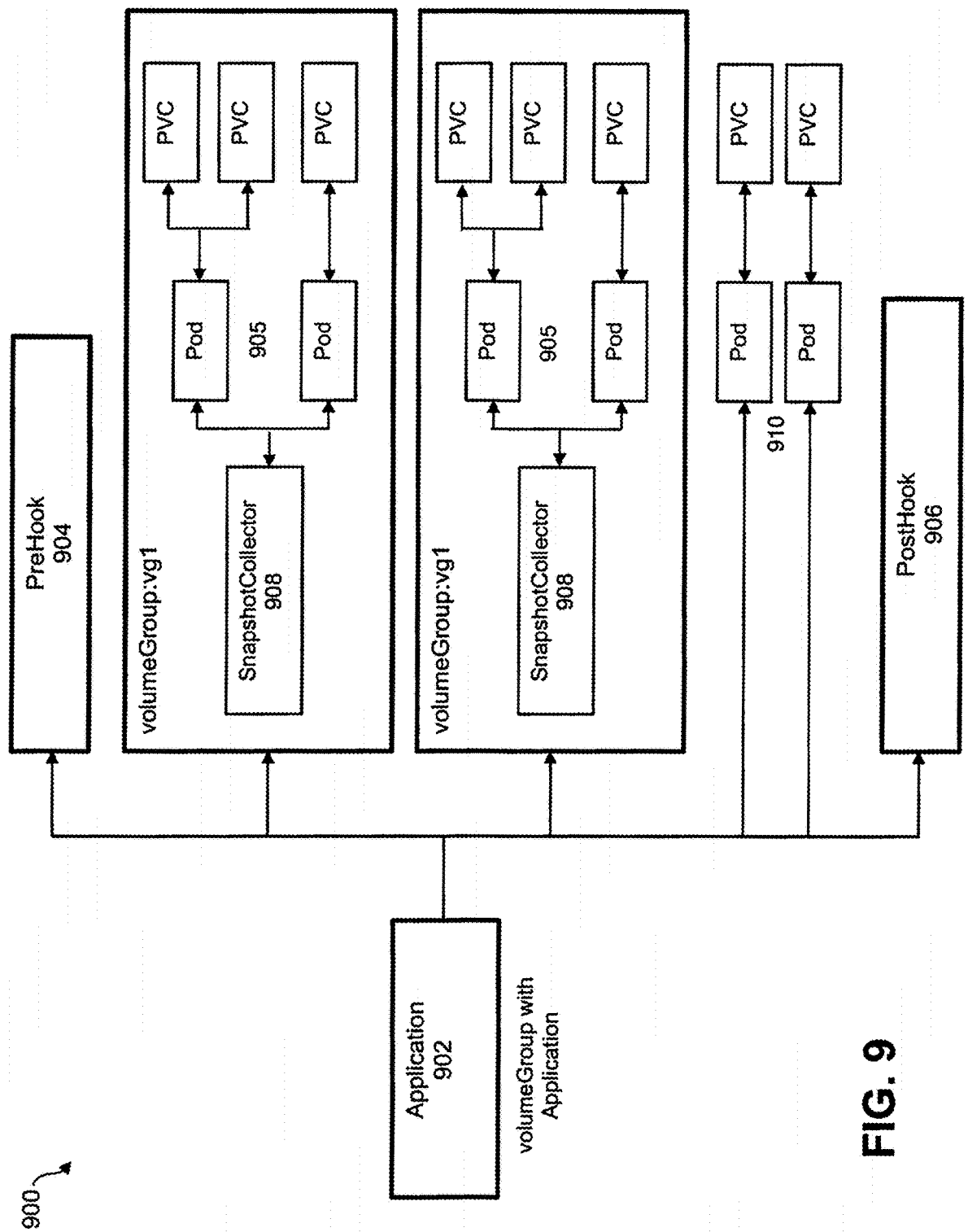
FIG. 9 is a diagram illustrating cluster-wide application consistent database operations using volume group snapshots, under some embodiments.

FIG. 9 is a system implementing cluster-wide application consistency using volume group snapshots, under some embodiments. As shown in FIG. 9, system 900 comprises an application 902. The application comprises a number of different volume groups and individual pods. For the example of FIG. 9, two volume groups are denoted vg1 and vg2 and each comprises a number of respective pods 305 that in turn each have a number of PVCs. The application can also comprise a number of loose (non-grouped) pods 910, with each pod having a respective PVC. A PreHook 904 and a PostHook 906 delineate the application 902. FIG. 9 is provided for purposes of illustration only, and any number of volume groups, pods (grouped or loose), PVCs, and so on may be used.

Figure 10:
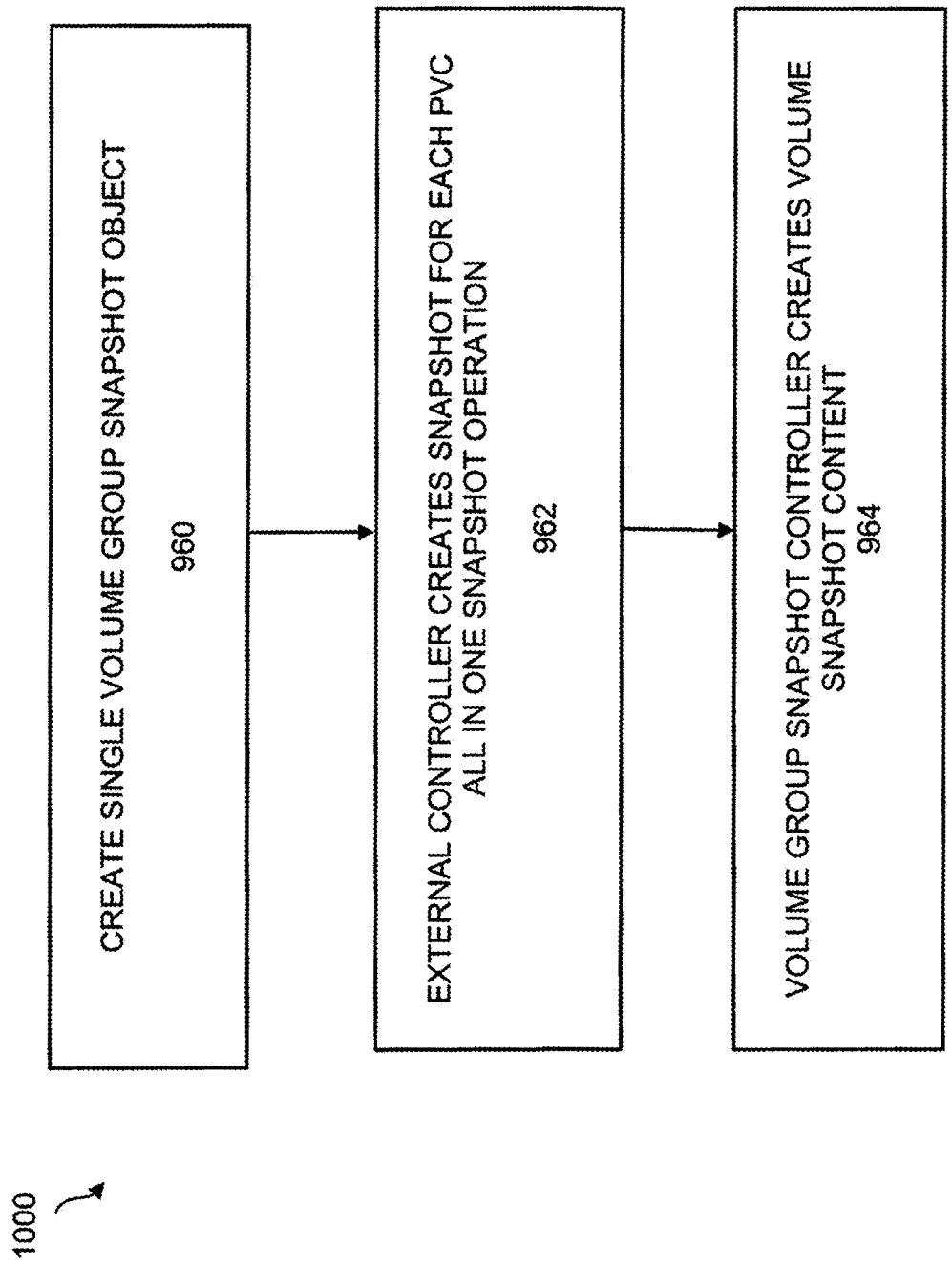
FIG. 10 is a flowchart illustrating an overall method of creating cluster-wide application consistent operations using volume group snapshots, under some embodiments.

FIG. 10 is a flowchart illustrating an overall method of creating cluster-wide application consistent operations using volume group snapshots, under some embodiments. As shown for process 1000, the process 112 first creates a single volume group snapshot object on the Kubernetes API server for all of the PVCs, 960. The external controller works with the CSI driver to create the volume group snapshot on the backend storage device, 962. When the backend snapshots of all volumes in the volume group are available, the external controller then creates the volume snapshot content, 964. Unlike previous embodiments in which this series of actions is done for each PVC serially, in process 1000, one volume group snapshot object is created, 960, and the snapshot controller create all snapshots at once, 962. This ensures the consistency across all PVC volumes being snapshotted at that moment.

Figure 11:
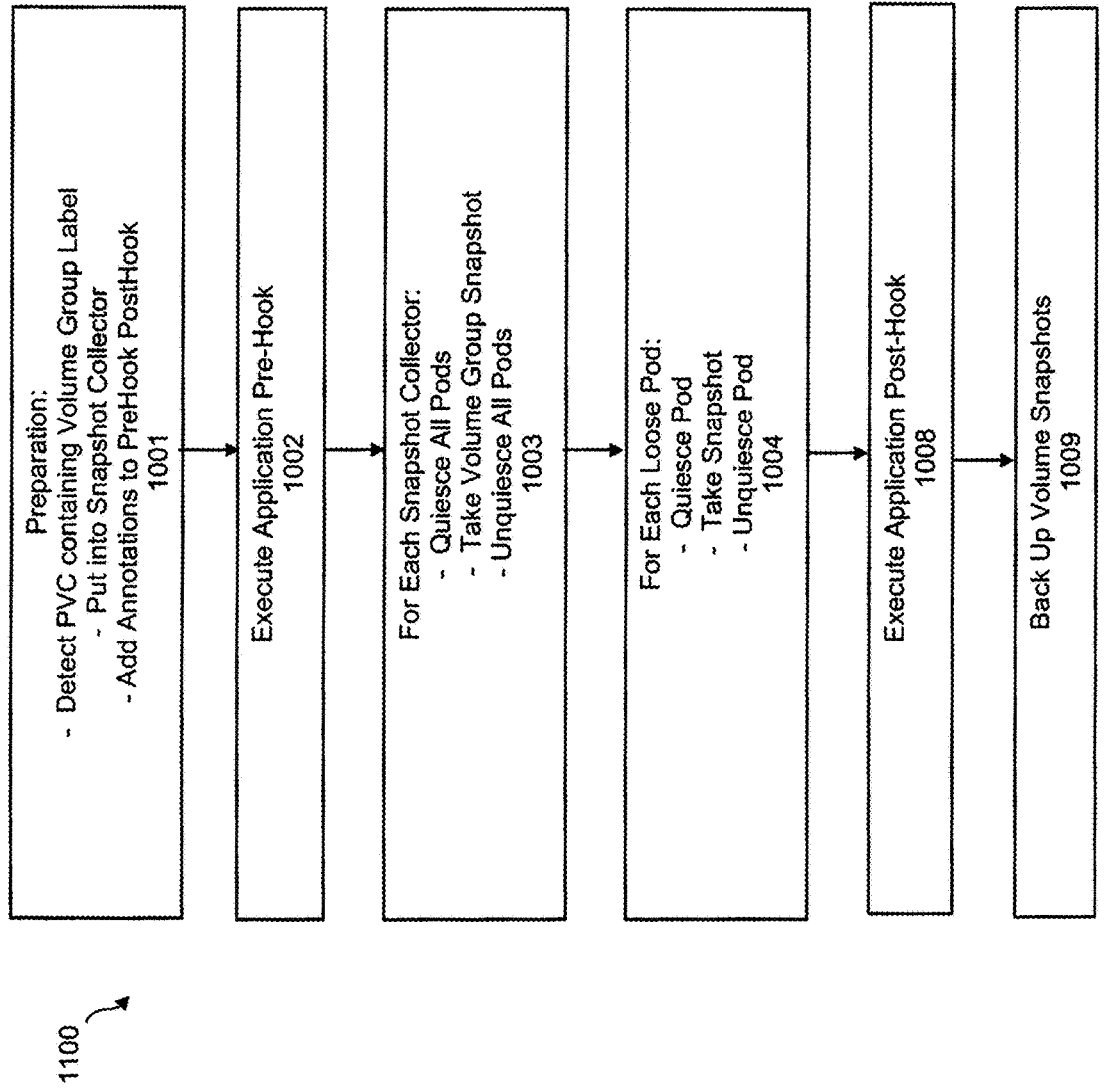
FIG. 11 is a flowchart illustrating a general method of providing cluster-wide application consistency with volume group snapshots, under some embodiments.

FIG. 11 is a flowchart illustrating a general method of providing cluster-wide application consistency with volume group snapshots, under some embodiments. As shown in process 1100, in preparation phase 1001, the framework will first detect whether a PersistentVolumeClaim (PVC) contains volume group label and put them into a snapshot collector corresponding to that label. Each snapshot collector corresponds to a distinct volume-group label and it will contain all PVCs with such a label. The snapshot collector also contains the list of all pods that used these PVCs. Based on a pod's AppAction in the application template, the framework will also add quiesce and unquiesce commands as PreHook and PostHook annotations accordingly, on each pod belong to the snapshot collector.

If the application has more than one volume group and the order of these volume group being backed up is important, the user can add an application AppAction to the application template. In the Application AppAction, Kind would be set to "SnapshotCollector" and the Selectors array will be a sequence of the selector to select the snapshot collector to be backed up. The framework will process the application template and sort the snapshot collector according to the order of the selector in the Selectors array.

Before going to the creating snapshots phase, if application's AppAction has any PreHook, the framework will execute the Application's PreHook first, 1002.

During the phase of creating snapshots 1003, the framework would have an array of snapshot collectors in a specific order. For each snapshot collector, the framework will execute the PreHook command of all pods belong to the snapshot collector in parallel. After all PreHook commands are executed successfully, the process then creates a volume group snapshot for the volume group associate with this snapshot collector. The volume snapshots for all PVCs belong to the volume group will be created at the same time. The process will then execute PostHook command of all Pods in parallel.

As shown in FIG. 9 the application may comprise one or more loose pods 910 in addition to grouped pods. As shown in step 104, for each loose pod, the process quiesces the pod, takes a snapshot of the pod, and then unquiesces the pod.

After completion of the creating snapshots phase for both groups and loose pods, if the application's AppAction has any PostHook, the framework will execute the application's PostHook, 1008.

In the backup snapshots phase 1009, the process 112 will use the data mover to back up each volume snapshot to appropriate backup storage, such as backend 109.

Although embodiments are described with reference to database applications, and specifically MySQL databases, it should be noted that embodiments are not so limited. Any appropriate database may be used, such as MongoDB. For this alternate embodiment, the structure of FIG. 5 may be represented as Shards and OpsManager components in a MongoDB Sharded cluster with multiple Stateful sets. The use of an application template to suspend/resume certain resources or processes using the prehook and posthook mechanisms would be similar to that shown in FIG. 6.

Embodiments of the volume group snapshot embodiment of the application template process are especially useful in distributed systems having distributed applications. As mentioned above, multi-sharded databases are common example of such applications, but any sharded application may be used. Sharding (also referred to as 'horizontal partitioning' is used to distribute application data among multiple machines, so that a cluster of database systems can store larger datasets and handle additional requests. Sharding is necessary if a dataset is too large to be stored in a single database, and sharding strategies allow additional machines to be added, thus allowing a database cluster to scale along with its data and traffic growth. Sharding essentially splits a homogeneous type of data into multiple databases. Because it is easily generalizable, sharding can be implemented at either the application or database level. In many databases, sharding is a first-class concept, and the database knows how to store and retrieve data within a cluster. Almost all modern databases, and Cassandra, HBase, HDFS, and MongoDB are examples of popular distributed databases.

In an embodiment, application 902 in FIG. 9 may be a multi-sharded database, but embodiments are not so limited, and any application that generates and/or uses data distributed over many machines or nodes may be used.

Figure 12:
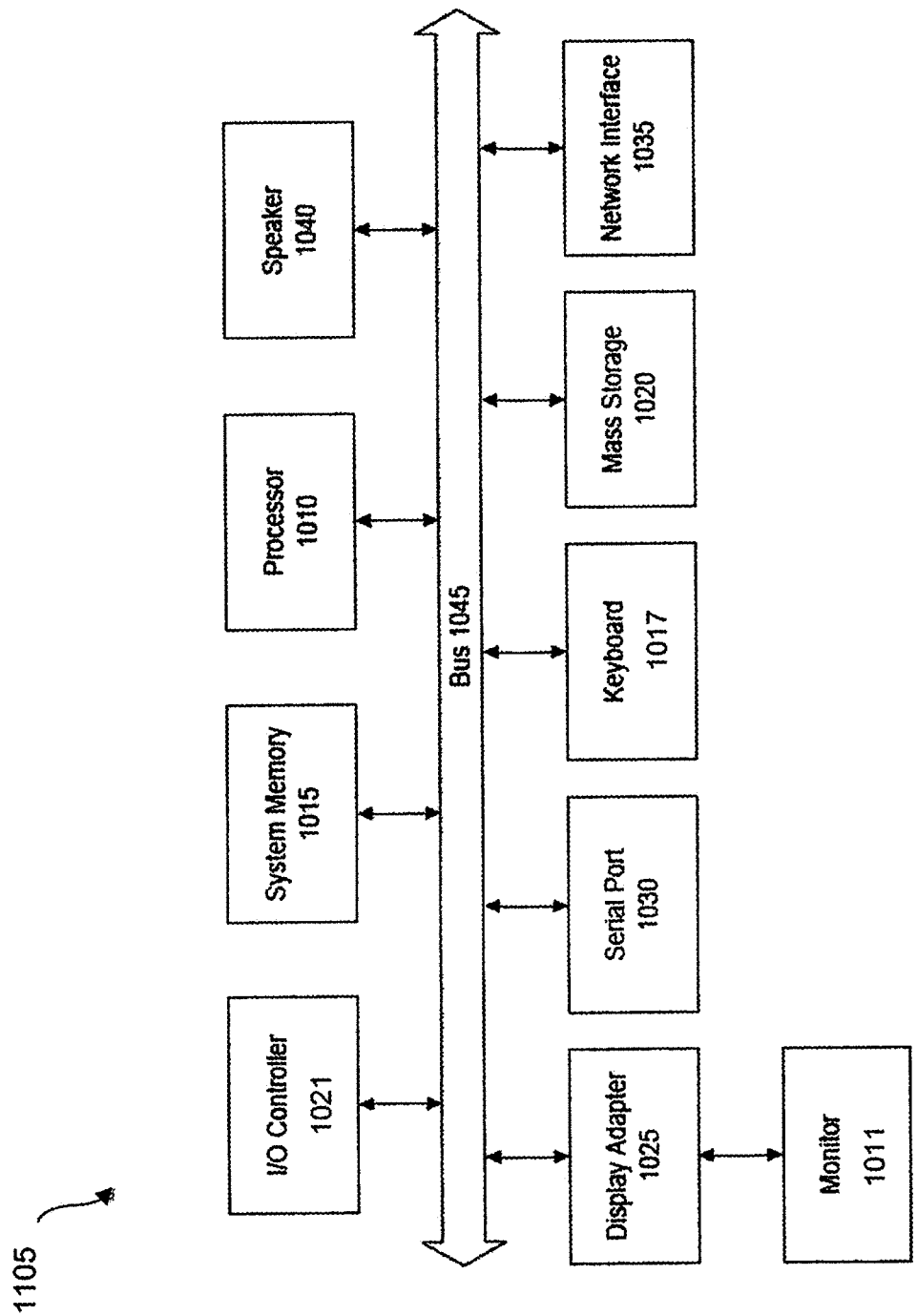
FIG. 12 shows a system block diagram of a computer system used to execute one or more software components of the present system described herein.

The network of IG. 1 may comprise any number of individual client-server networks including virtual machines coupled over the Internet or similar large-scale network or portion thereof. Each processing device in the network or container system may comprise a computing device capable of executing software code to perform the processing steps described herein, FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing cluster-wide, application consistent operations in a distributed network, comprising:

creating a single volume group snapshot object on a server for all of volumes of a plurality of distributed applications, wherein the applications are arranged by an application template into a nested sequence of applications and that suspends and restarts resources utilized by respective applications in a defined order;

defining a prehook and posthook annotation for each application, wherein the prehook and posthook annotation comprises a pair-ordered sequence dictating suspending and restarting the resources utilized by the respective application to ensure maintaining resource consistency during application operation and preventing a need of application quiescing during the suspending and restarting;

creating, by a snapshot controller, volume snapshot content for each volume;

creating, by an external snapshot process and upon creation of the volume snapshot content, a snapshot of each volume on a backend storage device, wherein all snapshots are created at the same time to ensure consistency across all volumes being snapshotted at a certain moment;

defining, for the snapshot process, an application template comprising a plurality of data fields including an application type field, an application label field specifying a label for all pods belonging to an application, and an actions field mapping actions performed on specific resource types and comprising pre-hook, post-hook, kind, and selectors subfields, wherein the selectors subfield specifies resources selected during a serialization phase of system operation for the volumes being snapshotted; and processing the application template through a package manager component to execute the volume snapshotting and perform suspension and restart according to the prehook and posthook annotations, wherein an order of quiescing ensures application consistency of the cluster network across all the nodes in the cluster.

2. The method of claim 1 further comprising:

defining, for the application template, label selectors used by all resources of the application to select resources to be suspended during execution of the application and restarted after execution of the application;

marking the selected resources with the prehook and posthook annotations to signal a suspension time and restart time for each respective selected resource.

3. The method of claim 2 wherein the prehook and posthook annotations provide entry points for execution of appropriate program scripts to suspend and restart the respective resource during execution of the application.

4. The method of claim 3 wherein the respective resources are provided in a plurality of layers comprising an application-level top layer, a middle layer, and a node-level bottom layer.

5. The method of claim 4 wherein the top layer resources are suspended before and restarted after the middle and bottom layer resources, and the middle layer resources are suspended before and restarted after the bottom layer resources.

6. The method of claim 1 wherein the application comprises a multi-sharded database application.

7. The method of claim 6 wherein the network comprises a Kubernetes cluster having a controller, an application program interface (API) server, and a data migration process.

8. The method of claim 7 wherein the prehook comprises quiescing the selected pods during application execution, and the posthook comprises unquiescing the selected pods after application execution.

9. The method of claim 7 wherein the application data comprises persistent volume data implemented as a Kubernetes PersistentVolume (PV) in the cluster.

* * * * *